US010436332B2

(12) United States Patent
Sansum et al.

(10) Patent No.: US 10,436,332 B2
(45) Date of Patent: Oct. 8, 2019

(54) FLUID CONTROL VALVES

(71) Applicant: Kohler Mira Limited, Cheltenham (GB)

(72) Inventors: Nigel P. Sansum, Gloucester (GB); Simon Westgate, Cheltenham (GB); Benjamin Lea, Cheltenham (GB); Richard James Mead, Cheltenham (GB)

(73) Assignee: KOHLER MIRA LIMITED (GB)

( * ) Notice: Subject to any disclaimer, the term of this patent is extended or adjusted under 35 U.S.C. 154(b) by 22 days.

(21) Appl. No.: 15/428,979

(22) Filed: Feb. 9, 2017

(65) Prior Publication Data

US 2017/0152956 A1    Jun. 1, 2017

Related U.S. Application Data

(63) Continuation of application No. PCT/GB2015/052773, filed on Sep. 24, 2015.

(30) Foreign Application Priority Data

Sep. 24, 2014  (GB) .................................. 1416876.9

(51) Int. Cl.
*F16K 11/074* (2006.01)
*G05D 23/13* (2006.01)
*F16K 31/60* (2006.01)

(52) U.S. Cl.
CPC ........ *F16K 11/074* (2013.01); *F16K 11/0743* (2013.01); *F16K 31/60* (2013.01); *G05D 23/1313* (2013.01); *G05D 23/1353* (2013.01)

(58) Field of Classification Search
CPC .... F16K 11/074; F16K 11/0743; F16K 31/60; G05D 23/1313; G05D 23/1353
See application file for complete search history.

(56) References Cited

U.S. PATENT DOCUMENTS 3,228,603 A * 1/1966 Norman ............. G05D 23/1353
                                                                137/605
4,607,788 A   8/1986 Bendall et al.
(Continued)

FOREIGN PATENT DOCUMENTS

DE        19901854        7/2000
DE    102010018671       11/2011
(Continued)

OTHER PUBLICATIONS

International Search Report re Application No. PCT/GB2015/052773 dated Apr. 22, 2016; 6 pages.
(Continued)

*Primary Examiner* — Matthew W Jellett
*Assistant Examiner* — Christopher D Ballman
(74) *Attorney, Agent, or Firm* — Foley & Lardner LLP

(57) ABSTRACT

A fluid control valve for mixing hot and cold water has an inlet for cold water, an inlet for hot water, and at least one outlet for temperature controlled water. The valve further includes a temperature control device for mixing hot and cold water to provide a source of temperature controlled water that includes a cartridge having inlet ports in communication with the inlets for hot and cold water and an outlet port in communication with the at least one outlet for temperature controlled water. The valve further includes an inner sleeve that defines with the cartridge a first passageway, and an outer sleeve that defines with the inner sleeve and cartridge a second passageway. The first and second passageways are configured to deliver hot and cold water to the inlet ports of the cartridge.

32 Claims, 13 Drawing Sheets

(56) References Cited

U.S. PATENT DOCUMENTS

| | | | | |
|---|---|---|---|---|
| 4,609,007 | A * | 9/1986 | Uhl | F16K 11/074 137/270 |
| 5,340,018 | A * | 8/1994 | MacDonald | G05D 23/1353 236/12.2 |
| 5,462,224 | A * | 10/1995 | Enoki | G05D 23/1353 137/606 |
| 5,927,597 | A * | 7/1999 | Bolgar | G05D 23/1353 137/625.17 |
| 6,279,831 | B1 * | 8/2001 | Lorch | G05D 23/1353 236/12.13 |
| 6,454,175 | B1 * | 9/2002 | Lorch | G05D 23/1353 137/625.41 |
| 6,557,770 | B2 * | 5/2003 | Mace | F16K 11/0743 137/625.41 |
| 6,676,025 | B2 * | 1/2004 | Ginter | F16K 11/0787 137/625.4 |
| 7,163,157 | B2 * | 1/2007 | Goncze | G05D 23/1346 236/12.16 |
| 7,611,068 | B2 * | 11/2009 | Iwai | F16K 19/006 137/457 |
| 7,673,808 | B2 * | 3/2010 | Mace | G05D 23/1353 137/625.41 |
| 7,770,808 | B2 * | 8/2010 | Ruga | G05D 23/1353 137/625.41 |
| 7,850,088 | B2 * | 12/2010 | Wei | F16K 11/0743 137/625 |
| 7,905,424 | B2 * | 3/2011 | Li | F16K 11/0743 137/625.4 |
| 8,074,893 | B2 * | 12/2011 | Mace | G05D 23/1353 236/12.11 |
| 8,740,097 | B2 * | 6/2014 | Platet | G05D 23/1353 236/12.11 |
| 2003/0234295 | A1 * | 12/2003 | Mace | G05D 23/1353 236/12.2 |
| 2006/0243813 | A1 * | 11/2006 | Beck | G05D 23/1353 236/12.11 |
| 2009/0266431 | A1 | 10/2009 | Chen | |
| 2013/0099007 | A1 | 4/2013 | Baker | |
| 2014/0261744 | A1 * | 9/2014 | Sansum | G05D 23/1353 137/15.18 |

FOREIGN PATENT DOCUMENTS

| | | |
|---|---|---|
| EP | 2146123 | 1/2010 |
| GB | 2253680 | 9/1992 |
| GB | 2392225 | 2/2004 |
| WO | WO02/25147 | 3/2002 |

OTHER PUBLICATIONS

European Search Report re Application No. 17159319.7 dated Jul. 10, 2017; 6 pages.

* cited by examiner

FLUID CONTROL VALVES

CROSS-REFERENCE TO RELATED PATENT APPLICATIONS

The present application is a Continuation of International Patent Application PCT/GB2015/052773, filed Sep. 24, 2015, which claims the benefit of and priority to United Kingdom Patent Application GB 1416876.9, filed Sep. 24, 2014. The entire disclosures of each of the foregoing applications is incorporated herein by reference in its entirety.

BACKGROUND

The present application relates to fluid control valves and in particular, but not exclusively to control valves for mixing two fluids. More especially the present application relates to control valves for mixing hot and cold water to provide a source of temperature controlled water for washing, bathing or the like.

For convenience, in the following description, reference will be made to mixing hot and cold water but it will be understood that this not intended to be limiting and that features of any embodiments may be employed for mixing fluids other than water.

Fluid control valves for plumbing fixtures (e.g., shower control valves) often include a control mechanism to prevent the sudden change in temperature of the water. A common example of such control mechanism is a thermostatic valve, which uses a thermostat to control the flow of hot and cold water.

A typical thermostatic valve has a cold water inlet, a hot water inlet, and a mixed water outlet. A typical thermostatic valve has user operable controls that allow the user to turn the flow on and off and select a desired mixed water temperature.

In operation, the mixed water flows over a thermostat, the response of which to deviation in the temperature of the mixed water from the selected temperature causes the relative proportions of hot and cold water flowing through the valve to change and return the temperature of the mixed water to the selected temperature. The user operable controls generally also allow the user to control flow rate.

In a typical thermostatic valve, an outlet for mixed water may be connected to a separate diverter valve with multiple outlets for connection to different fittings that allow the user to select and direct mixed water to a single fitting or combination of fittings.

The provision of a separate diverter valve adds to installation costs and requires the user to operate separate controls for the thermostatic valve and the diverter valve. This complicates operation and may not be suitable for some users.

Thus, there is a need for an improved thermostatic valve that provides enhanced functionality. It is also a desirable aim to provide improved functionality with a reliable construction and ease of operation having benefits for the manufacturer and/or user of the thermostatic valve.

SUMMARY

An exemplary embodiment relates to a fluid control valve for mixing hot and cold water has an inlet for cold water, an inlet for hot water, and at least one outlet for temperature controlled water. The valve further includes a temperature control device for mixing hot and cold water to provide a source of temperature controlled water that includes a cartridge having inlet ports in communication with the inlets for hot and cold water and an outlet port in communication with the at least one outlet for temperature controlled water. The valve further includes an inner sleeve that defines with the cartridge a first passageway, and an outer sleeve that defines with the inner sleeve and cartridge a second passageway. The first and second passageways are configured to deliver hot and cold water to the inlet ports of the cartridge.

DETAILED DESCRIPTION

Figure 1:
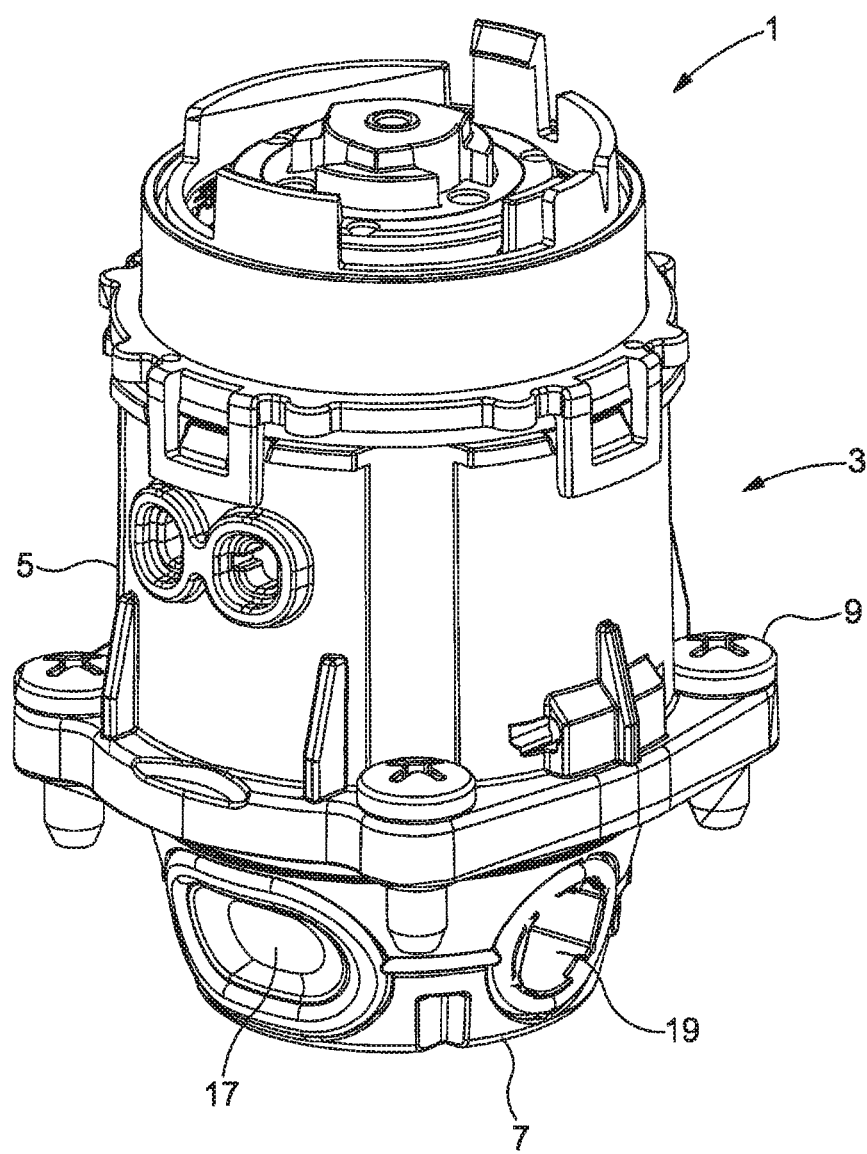
FIG. 1 is a perspective view of a thermostatic mixer valve according to an exemplary embodiment.
Figure 2:
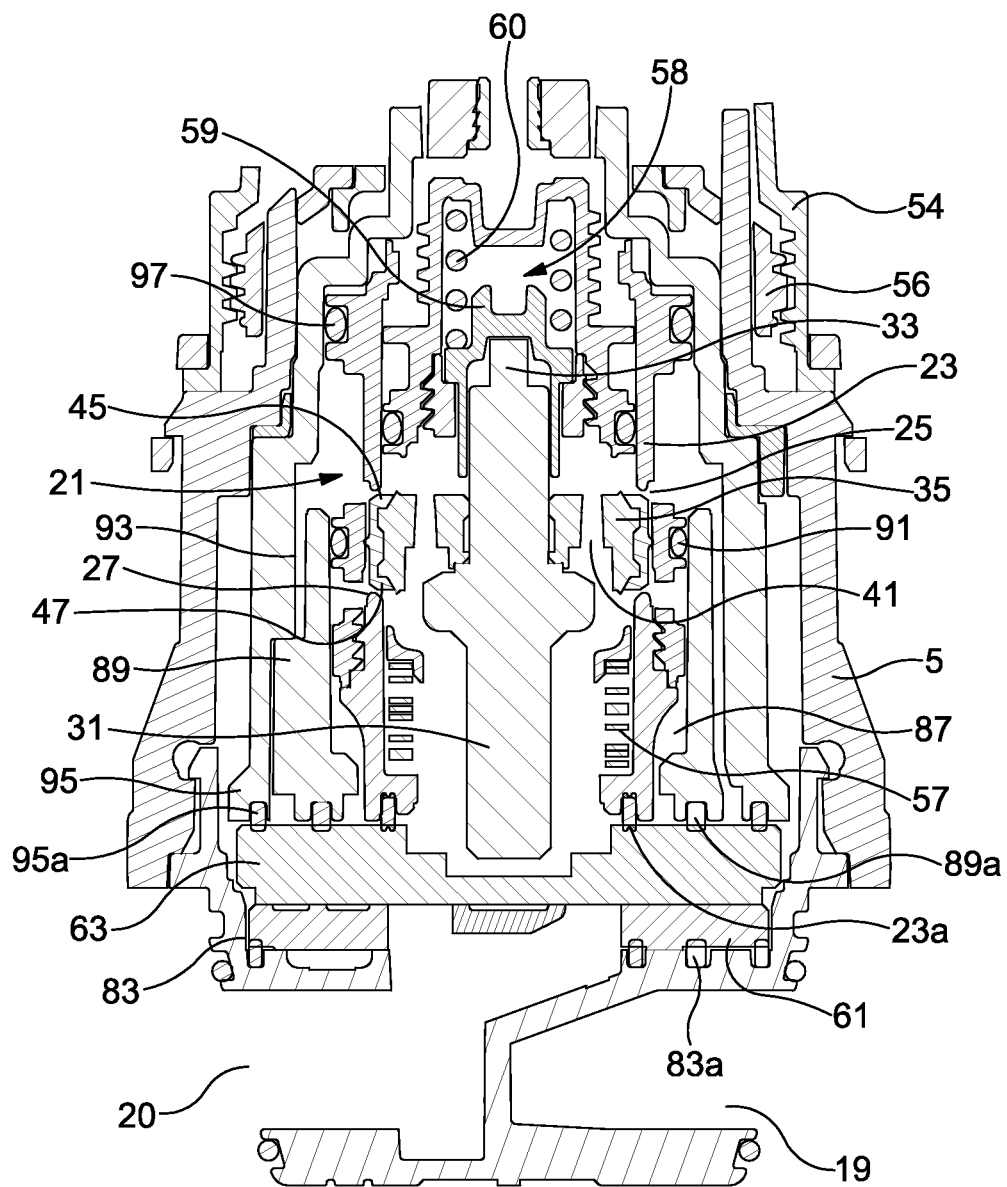
FIG. 2 is a sectional view of the valve shown in FIG. 1.
Figure 3:
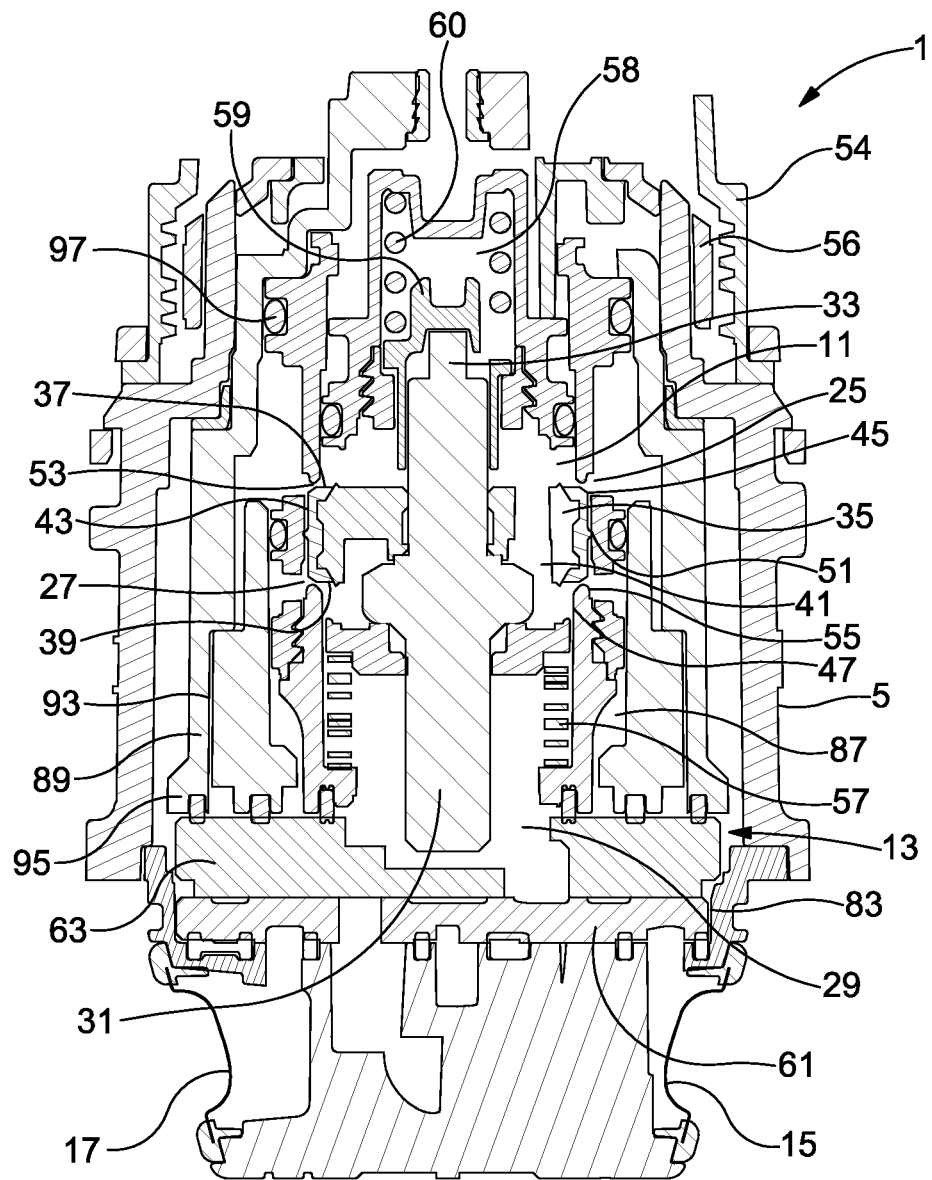
FIG. 3 is a sectional view of the valve shown in FIG. 1 normal to the view in FIG. 2.
Figure 4:
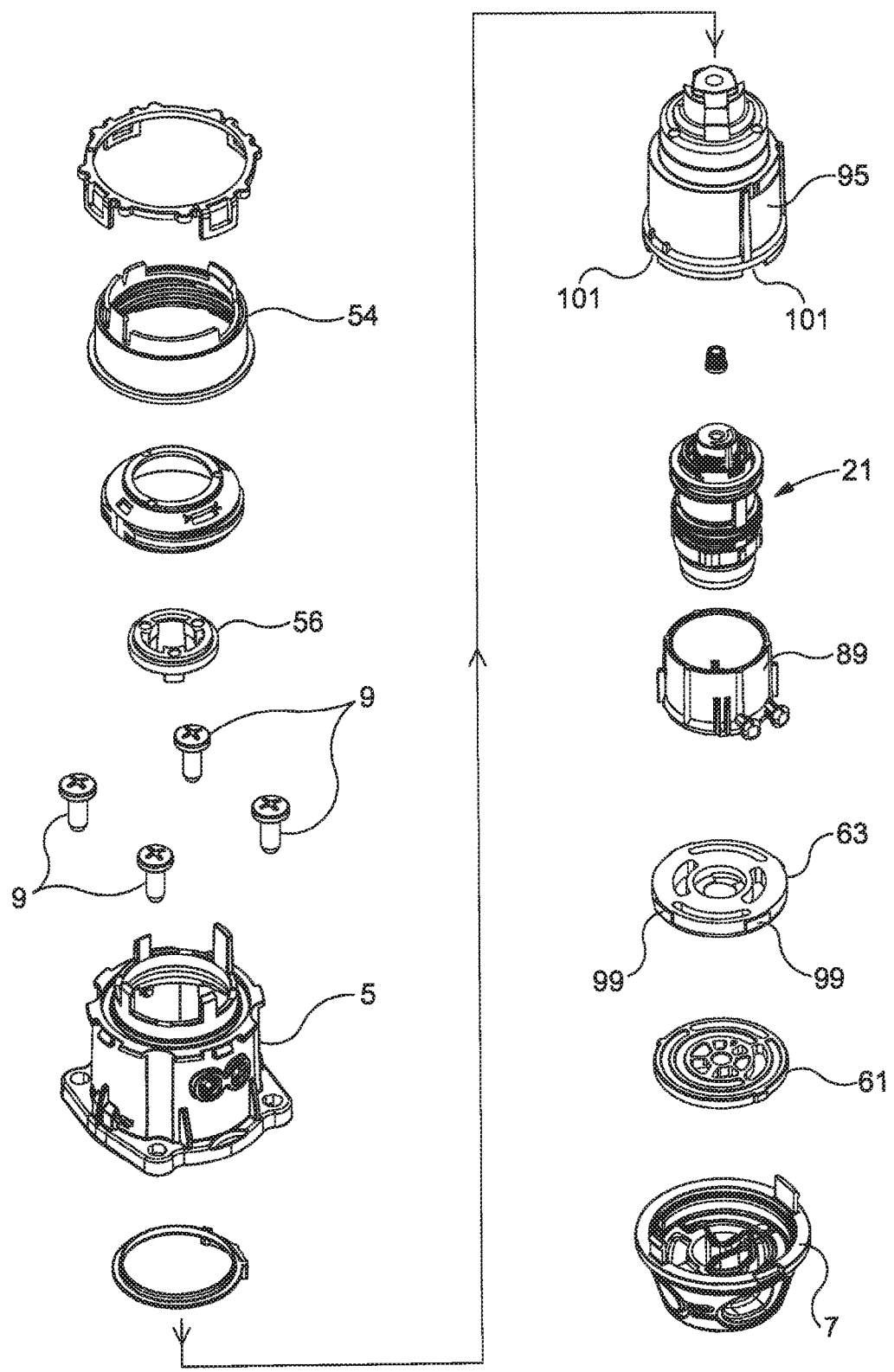
FIG. 4 is an exploded view of the valve shown in FIGS. 1 to 3.

One embodiment relates to a fluid control valve for mixing hot and cold water. The valve has an inlet for cold water, an inlet for hot water and at least two outlets for temperature controlled water.

It may be that the valve further has a flow control device for controlling flow of water through the valve. The flow control device may control flow of water at the inlets and outlets of the valve. The flow control device may comprise control members that are relatively movable to align and misalign ports in the control members to control flow of water at the inlets and outlets of the valve. The control members may be disposed one on top of the other. There may be two control members. One control member may be fixed and the other control member may be movable relative to the fixed control member. The movable control member may be rotatable relative to the fixed control member. The control members may comprise discs. The control members may be made of ceramic material. The control members may have inlet ports that can align or at least partially align in response to relative movement to control flow of water at the hot and cold inlets and that can misalign to shut-off flow of water at the hot and cold inlets. The control members may have outlet ports that can align or at least partially align in response to relative movement to control flow of water at the outlets and that can misalign to shut-off flow of water at the outlets. Relative movement of the members may align or at least partially align outlet ports of one or both outlets. The movable member may be rotatable in a clockwise direction to permit flow to a first outlet and then to the first outlet and a second outlet. The movable member may be rotatable in an anti-clockwise direction to permit flow to the second outlet and then to the second outlet and the first outlet. One or more stops may be provided to block rotation of the movable member to prevent flow to an outlet or combination of outlets. In some embodiments, a stop may allow rotation of the movable member in the clockwise direction to select the first outlet and the first and second outlets and to block rotation in the anticlockwise direction to select the second outlet and the first and second outlets and vice versa. In other embodiments, a pair of stops may allow rotation of the movable member in the clockwise direction to select the first outlet and in the anticlockwise directions to select the select outlet and to block rotation in both directions to select both the first and second outlets. The or each stop may be releasable. The or each stop may be detachable or movable to a position in which the stop is inoperable.

It may be that the valve further has a temperature control device for mixing hot and cold water to provide a source of temperature controlled water. The temperature control device may comprise a cartridge. The cartridge may be thermostatic. The cartridge may have inlet ports in communication with the inlet ports of the flow control device and an outlet port in communication with the outlet ports of the flow control device. The inlet ports of the cartridge may be spaced apart in an axial direction. The outlet port of the cartridge may be coaxial with an axis of rotation of the rotatable control member. In other arrangements, the outlet port may be offset from the axis of rotation. The hot and cold water inlet ports of the flow control device may be spaced from the axis of rotation of the rotatable control member. The inlet ports may be concentric with the axis of rotation. The hot and cold water inlet ports of the flow control device may be spaced apart in a radial direction and a circumferential direction. The hot water inlet ports may be inboard of the cold water inlet ports or vice versa. The outlet ports of the flow control device may be inboard of the hot and cold water inlet ports. The outlet ports may be spaced from the axis of rotation of the rotatable control member. The outlet ports may be concentric with the axis of rotation. The valve may have an inner sleeve that defines with the cartridge a first passageway, and an outer sleeve that defines with the inner sleeve and cartridge a second passageway. The first and second passageways may be configured to deliver hot and cold water to the inlet ports of the cartridge. The first passageway delivers hot water to the inlet port for hot water and the second passageway delivers cold water to the inlet port for cold water.

Another embodiment relates to a fluid control valve for mixing hot and cold water. The valve has an inlet for cold water, an inlet for hot water and at least one outlet for temperature controlled water.

It may be that the valve further has a temperature control device for mixing hot and cold water to provide a source of temperature controlled water. The temperature control device may comprise a cartridge. The cartridge may be thermostatic. The cartridge may have inlet ports in communication with the inlets for hot and cold water and an outlet port in communication with the outlet for temperature controlled water. The valve may have an inner sleeve that defines with the cartridge a first passageway, and an outer sleeve that defines with the inner sleeve and cartridge a second passageway. The first and second passageways deliver the hot and cold water to the inlet ports of the cartridge. The first passageway may deliver hot water to the inlet port for hot water and the second passageway may deliver cold water to the inlet port for cold water. The inlet ports of the cartridge may be spaced apart in an axial direction. The inner and outer sleeves may be separate components. Alternatively, the inner and outer sleeves may be a single component.

It may be that the valve further has a flow control device for controlling flow of water through the valve. The flow control device may control flow of water at the inlets and outlets of the valve. The flow control device may comprise control members that are relatively movable to align and misalign ports in the control members to control flow of water at the inlets and outlets of the valve. The control members may be disposed one on top of the other. There may be two control members. One control member may be fixed and the other control member may be movable relative to the fixed control member. The movable control member may be rotatable relative to the fixed control member. The control members may comprise discs. The control members may be made of ceramic material. The rotatable control member may be coupled to the outer sleeve and rotatable with the outer sleeve for controlling flow of hot and cold water to the cartridge.

The control members may have inlet ports that can align or at least partially align in response to relative movement to control flow of water at the hot and cold inlets and that can misalign to shut-off flow of water at the hot and cold inlets. The outlet port of the temperature control device may be coaxial with an axis of rotation of the rotatable control member. In other arrangements the outlet port may be offset from the axis of rotation. The hot and cold water inlet ports of the flow control device may be spaced from the axis of rotation of the rotatable control member. The inlet ports may be concentric with the axis of rotation. The hot and cold water inlet ports of the flow control device may be spaced apart in a radial direction and a circumferential direction. The hot water inlet ports may communicate with the first passageway and the cold water inlet ports may communicate with the second passageway or vice versa.

The valve may have at least two outlets for temperature controlled water and the control members may have outlet ports that can align or at least partially align in response to relative movement to control flow of water at the outlets and that can misalign to shut-off flow of water at the outlets. Relative movement of the members may align or at least partially align outlet ports of one or both outlets. The movable member may be rotatable in a clockwise direction to permit flow to a first outlet and then to the first outlet and a second outlet. The movable member may be rotatable in an anti-clockwise direction to permit flow to the second outlet and then to the second outlet and the first outlet. The outlet ports of the flow control device may be inboard of the hot and cold water inlet ports. The outlet ports may be spaced from the axis of rotation of the rotatable control member. The outlet ports may be concentric with the axis of rotation.

One or more stops may be provided to block rotation of the movable member to prevent flow to an outlet or combination of outlets. In some embodiments, a stop may allow rotation of the movable member in the clockwise direction to select the first outlet and the first and second outlets and to block rotation in the anticlockwise direction to select the second outlet and the first and second outlets and vice versa. In other embodiments, a pair of stops may allow rotation of the movable member in the clockwise direction to select the first outlet and in the anticlockwise directions to select the select outlet and to block rotation in both directions to select both the first and second outlets. Other stop arrangements may be employed. The or each stop may be releasable. The or each stop may be detachable or movable to a position in which the stop is inoperable.

A thermostatic mixer valve 1 according to an exemplary embodiment is shown in FIGS. 1 to 4 of the accompanying drawings.

Although aspects of the concepts discussed herein are described in relation to a thermostatic mixer valve in this exemplary embodiment, it will be understood that the concepts disclosed herein have application to both thermostatic mixer valves such as, but not limited to, the thermostatic mixer valve 1 shown in FIGS. 1 to 4 and non-thermostatic mixer valves.

Furthermore, aspects of the various concepts may be capable of wider application and are not necessarily limited to mixer valves, whether thermostatic or non-thermostatic, and the scope of the present disclosure is to be construed accordingly.

The thermostatic mixer valve 1 shown in FIGS. 1 to 4 has a body 3 with an upper part 5 and a lower part 7 releasably secured together by one or more fasteners which, in this embodiment, are screws 9.

The body 3 houses a temperature control device 11 for mixing hot and cold water to provide a source of temperature controlled water according to user selection and a flow control device 13 for controlling the flow of water through the valve 1.

The lower part 7 of the body 3 is provided with a first inlet 15 for cold water and a second inlet 17 for hot water on the opposite side of the body. The inlets 15, 17 may be provided with suitable markings to indicate the orientation of the inlets for connection to the supplies of hot and cold water.

The lower part of the body 3 is also provided with a first outlet 19 for temperature controlled water and a second outlet 20 on the opposite side of the body for temperature controlled water.

The outlets may be arranged at right angles to the inlets and may be provided with markings to indicate the orientation of the outlets for supply of temperature controlled water to a fitting such as a showerhead, handset, body spray or similar device.

The temperature control device 11 comprises a thermostatic cartridge 21 having a body 23 provided with a first inlet port 25 (e.g., opening, aperture, hole, etc) in the sidewall of the body 23 for cold water, a second inlet port 27 (e.g., opening, aperture, hole, etc.) in the sidewall of the body 23 for hot water axially spaced apart from the first inlet port, and an outlet port 29 (e.g., opening, aperture, hole, etc) for temperature controlled water in the end wall of the body 23.

Portions of the first and second inlet ports 25, 27 may extend circumferentially at least partially around the body 23. Alternatively, the first and second inlet ports 25, 27 may comprise a series of openings, apertures, holes, etc spaced apart in the circumferential direction.

The cartridge 21 includes a thermostat 31 containing a temperature responsive material (e.g., wax; not shown) and operatively coupled to a piston 33 responsive to thermal expansion and contraction of the temperature responsive material.

In operation, the piston 33 advances (e.g., push out, etc.) from the thermostat 31 and retracts (e.g., recede, pullback, etc.) into the thermostat 31 to change an operating length of the piston 33 in response to expansion and contraction of the temperature responsive material.

The cartridge 21 also includes a shuttle 35 coupled to the thermostat 31 to form, at least in part (i.e., to be at least some of the components of), a thermostat-shuttle assembly.

The shuttle 35 has a first side, shown as cold side 37, and a second side, shown as hot side 39, that is axially opposite the cold side 37. At least one (e.g., one, two, a plurality, etc.) of passages 41 (e.g., openings, apertures, holes, etc.) extend axially through the shuttle 35 from the cold side 37 to the hot side 39.

In operation, the passages 41 permit the flow of water from the cold side 37 to the hot side 39 of the shuttle 35.

The shuttle 35 is further shown to include an overmolded portion 43 that is overmolded (e.g., co-molded, insert-molded, etc.) onto the shuttle 35 at the outer periphery thereof.

The overmolded portion 43 includes a first end portion (e.g., top end, end portion, etc.), shown as cold end portion 45, a second end portion (e.g., bottom end, end portion, etc.), shown as hot end portion 47 and a sidewall portion 49 that includes a separator seal 51 engageable with a sidewall of the body 23 to separate the cold side of the shuttle 35 from the hot side.

The shuttle 35 is positioned between a cold seat 53 on the cold side 37 of the shuttle and a hot seat 55 on the hot side 39 of the shuttle axially spaced apart from the cold seat 53.

The cold seat 53 faces the cold end portion 45 and the hot seat 55 faces the hot end portion 47. The cold seat 53 is in fluid communication with the first inlet port 25 for cold water and the hot seat 55 is in fluid communication with the second inlet port 27 for hot water.

In operation, the axial position of the thermostat-shuttle assembly is adjusted by user operable control means such as a rotatable knob or lever (not shown) operatively coupled to the thermostat-shuttle assembly. In this embodiment, the rotatable knob or lever is connected to a sleeve member 54 rotatably mounted at the upper end of the upper part 5 of the body 3. A drive member 56 threadably engages the sleeve member 54 whereby rotation of the sleeve member 54 is converted into axial movement of the drive member 56 to adjust the position of the thermostat-shuttle assembly according to user selection of the outlet water temperature.

Actuation of the user operable control means controls the flow of cold water across the cold seat 53 to the cold side of the shuttle 35 and the flow of hot water across the hot seat 55 to the hot side of the shuttle 35.

The cold water flows from the cold side to the hot side of the shuttle 35 through the passages 41 to mix with the hot water and the mixed water flows over the surface of the thermostat 31 to the outlet port 29 to provide a source of temperature controlled mixed water.

If the water temperature sensed by the thermostat 31 is higher than the user selected temperature, the thermally responsive material expands causing the piston 33 to advance and increase the operating length so as to move the thermostat-shuttle assembly towards the hot seat 55 against the biasing of a return spring 57.

In this way the flow of hot water across the hot seat 55 is reduced and the flow of cold water across the cold seat 53 is increased to return the water temperature to the user selected temperature.

An overload unit 58 is provided to prevent the thermostat-shuttle assembly being damaged by an increase in the operating length of the piston 33 once the thermostat-shuttle assembly has been moved to position the shuttle 35 against the hot seat 55.

The overload unit 58 includes a cap member 59 slidably mounted on the thermostat and biased by an overload spring 60 to engage the projecting, outer end of the piston 33. An increase in operating length of the piston 33 caused by expansion of the thermally responsive material when the shuttle 35 is seated against the hot seat 55 displaces the cap member 59 to compress the overload spring 60.

If the water temperature sensed by the thermostat 31 is lower than the user selected temperature, the thermally responsive material contracts allowing the piston 33 to retract and reduce the operating length so as to move the thermostat-shuttle assembly towards the cold seat 53 under the basing of the return spring 57.

In this way the flow of hot water across the hot seat 55 is increased and the flow of cold water across the cold seat 53 is reduced to return the water temperature to the user selected temperature.

The user operable controls may allow the user to adjust the position of the thermostat-shuttle assembly between a first end position in which the hot end portion 47 of the shuttle 35 seats against the hot seat 55 to provide a flow of cold water only and a second end position in which the cold end portion 45 of the shuttle 35 seats against the cold seat 53 to provide a flow of hot water only and any intermediate position to provide a flow of mixed hot and cold water.

Figure 5:
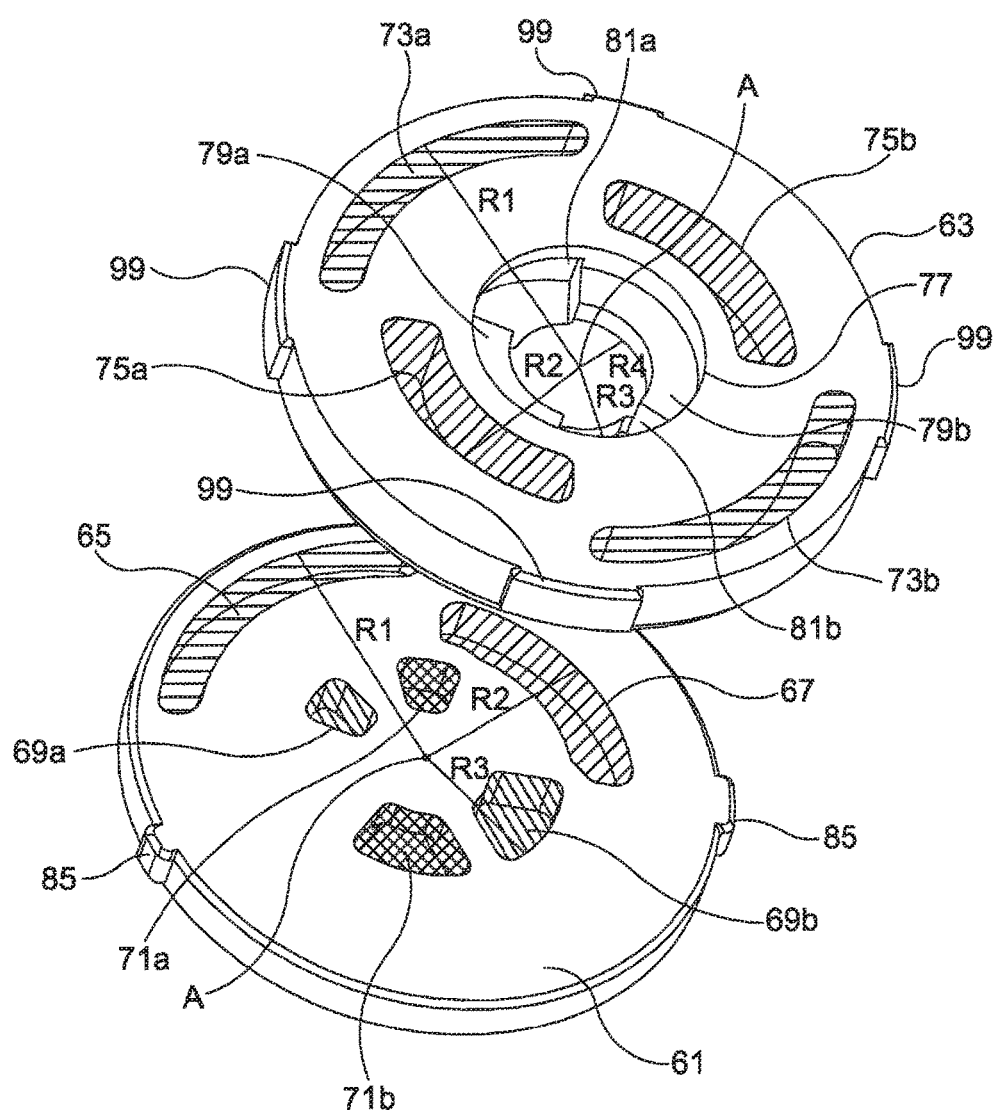
FIG. 5 is a perspective view of the fixed and moving ceramic discs shown in FIG. 4.

The flow control device 13 comprises a ceramic disc assembly having a first ceramic disc 61 and a second ceramic disc 63 positioned one on top of the other. The discs 61, 63 are shown in more detail in FIG. 5.

In this embodiment, the first disc 61, shown as the lower disc, is fixed and the second disc 63, shown as the upper disc, is rotatable relative to the first disc 61 about an axis A. The position of the discs may be reversed so that the fixed disc is on top of the rotatable disc.

In this embodiment, rotation of the second disc 63 relative to the first disc 61 is employed to control the flows of cold and hot water from the inlets 15, 17 to the inlet ports 25, 27 of the cartridge 21, and to control the flow of temperature controlled water from the outlet port 29 of the cartridge 21 to either one or both of the first and second outlets 19, 20 according to user selection.

The fixed ceramic disc 61 is provided with a cold water port 65, a hot water port 67 and first and second pairs of temperature controlled water ports 69a, 69b and 71a, 71b that extend through the disc 61 from an upper side to a lower side. The ports are spaced from the axis of rotation A and may be arranged concentrically with respect to the axis of rotation A.

The cold water port 65 is curved and extends in a circumferential direction for approximately 90 degrees at a fixed outer radius R1 from the axis of rotation A.

The hot water port 67 is curved and extends in a circumferential direction for approximately 90 degrees at a fixed outer radius R2 from the axis of rotation A where R2 is less than R1 such that the hot water port 67 is radially inboard of the cold water port 65.

The hot water port 67 is also offset from the cold water port 65 in the circumferential direction so as not overlap the cold water port 65 in the circumferential direction.

The first pair of temperature controlled water ports 69a, 69b are arranged on opposite sides of the axis of rotation A at a fixed outer radius R3 where R3 is less than R2 such the first pair of temperature controlled ports 69a, 69b is radially inboard of the hot water port 67.

The second pair of temperature controlled water ports 71a, 71b are also arranged on opposite sides of the axis of rotation at the same fixed outer radius R3 such that the second pair of temperature controlled ports 71a, 71b is radially inboard of the hot water port 67 and alternate with the first pair of temperature controlled ports 69a, 69b.

Each of the first and second pair of temperature controlled water ports 69a, 69b and 71a, 71b has one port larger than the opposed other port. This may not be essential and both ports may be of the same size.

The movable ceramic disc 63 is provided with a pair of cold water ports 73a, 73b, a pair of hot water ports 75a, 75b that extend through the disc 63 from an upper side to a lower side and a central opening 77 on the upper side.

Each cold water port 73a, 73b is curved and extends in a circumferential direction for approximately 90 degrees on opposite sides of the axis of rotation A and at the same fixed outer radius R1 from the axis of rotation A as the cold water port 65 in the fixed ceramic disc 61.

The cold water ports 73a, 73b are spaced apart approximately 90 degrees in the circumferential direction at both ends.

Each hot water port 75a, 75b is curved and extends in a circumferential direction for approximately 90 degrees on opposite sides of the axis of rotation A and at the same fixed outer radius R2 from the axis of rotation where R2 as the hot water port 67 in the fixed ceramic disc 61.

The hot water ports 75a, 75b are spaced apart approximately 90 degrees in the circumferential direction at both ends and are offset from the cold water ports 73a, 73b in the circumferential direction so as not overlap in the circumferential direction.

The central opening 77 is annular and is preferably coaxial with the axis of rotation A although this may not be essential and the opening 77 may be offset from the axis of rotation A. The disc 63 has opposed flange portions 79a, 79b within the opening 77 separated in the circumferential direction by opposed ports 81a, 81b that open to the lower side of the disc 63 and have the same outer radius R3 and inner radius R4 as the ports 69a, 69b, 71a, 71b in the disc 61.

The discs 61, 63 are positioned one on top of the other with the lower disc 61 received in a recessed portion 83 of the lower part 7 of the body 3 and the upper disc 63 extending above the recessed portion 83.

The lower disc 61 and recessed portion 83 are configured to prevent rotation of the disc 61. For example the disc 61 and recessed portion 83 may have co-operating formations to prevent rotation of the disc 61.

In this embodiment, the disc 61 has one or more projecting ribs 85, for example two, spaced apart around the circumference that are received in slots (not shown) spaced apart around the periphery of the recessed portion 83.

The co-operating formations are configured to position the disc 61 in a pre-determined orientation in the recessed portion 83.

The co-operating formations may position the disc 61 so that the cold water inlet 15 communicates with the cold water port 65, the hot water inlet 17 communicates with the hot water port 67, the first pair of temperature controlled ports 69a, 69b communicate with the first outlet 19 and the second pair of temperature controlled ports 71a, 71b communicate with the second outlet 20.

The co-operating formations may be non-symmetrical or otherwise configured for assembly in of the disc 61 in one orientation only. The recessed portion 83 of the lower part 7 of the body 3 is provided with a sealing member 83a to seal around and separate the ports in the lower side of the disc 61.

The disc 63 is arranged on top of the disc 61 and is rotatable about the axis of rotation A by user operable control means such as a rotatable knob or lever (not shown) operatively coupled to the disc 63 to control the flow of cold and hot water from the inlets 15, 17 to the inlet ports 25, 27 of the cartridge 21 and flow of temperature controlled water from the outlet port 29 of the cartridge 21 to either one or both of the outlets 19, 20 by varying the overlap of the ports in the disc 63 with the ports in the disc 61.

The lower end of the body 23 of the cartridge 21 seats on the upper side of the disc 63 with the outlet port 29 in the bottom of the cartridge 21 aligned with the central port 77 in the disc 63.

The hot water ports 75a, 75b communicate with the inlet port 27 of the cartridge 21 via an axially extending annular passageway 87 defined by a first or inner sleeve 89 that surrounds the lower portion of the body 23 of the cartridge 21.

The lower end of the inner sleeve 89 seats on the upper side of the disc 63 and the upper end of the sleeve 89 engages a seal 91 received in a groove in the outer surface of the body 23 of the cartridge 21.

The cold water ports 73a, 73b communicate with the inlet port 25 of the cartridge 21 via an axially extending annular passageway 93 defined by a second or outer sleeve 95 that surrounds the inner sleeve 89 and the upper portion of the body 23 of the cartridge 21. In this embodiment, the inner and outer sleeves 89, 95 are separate components. In other embodiments, the inner and outer sleeves 89, 95 may be a single component.

The lower end of the outer sleeve 95 seats on the upper side of the disc 63 and the upper end of the sleeve 95 engages a seal 97 received in a groove in the outer surface of the body 23 of the cartridge 21.

The lower ends of the body 23 of the cartridge 21, the inner sleeve 89, and the outer sleeve 95 are provided with sealing members 23a, 89a, 95a to seal around and separate the ports in the upper side of the disc 63.

The disc 63 is configured for engagement with a drive member for rotating the disc 63 about the axis of rotation. For example, the disc 63 and drive member may have co-operating formations to couple the drive member to the disc 63.

In this embodiment, the disc 63 has one or more projecting ribs 99, for example four, spaced apart around the circumference that are received in slots 101 spaced apart around the periphery of the outer sleeve 95 which forms the drive member for the disc 63.

The operation of the flow control device 13 will now be described in more detail with particular reference to FIGS. 6 to 10.

Figure 6:
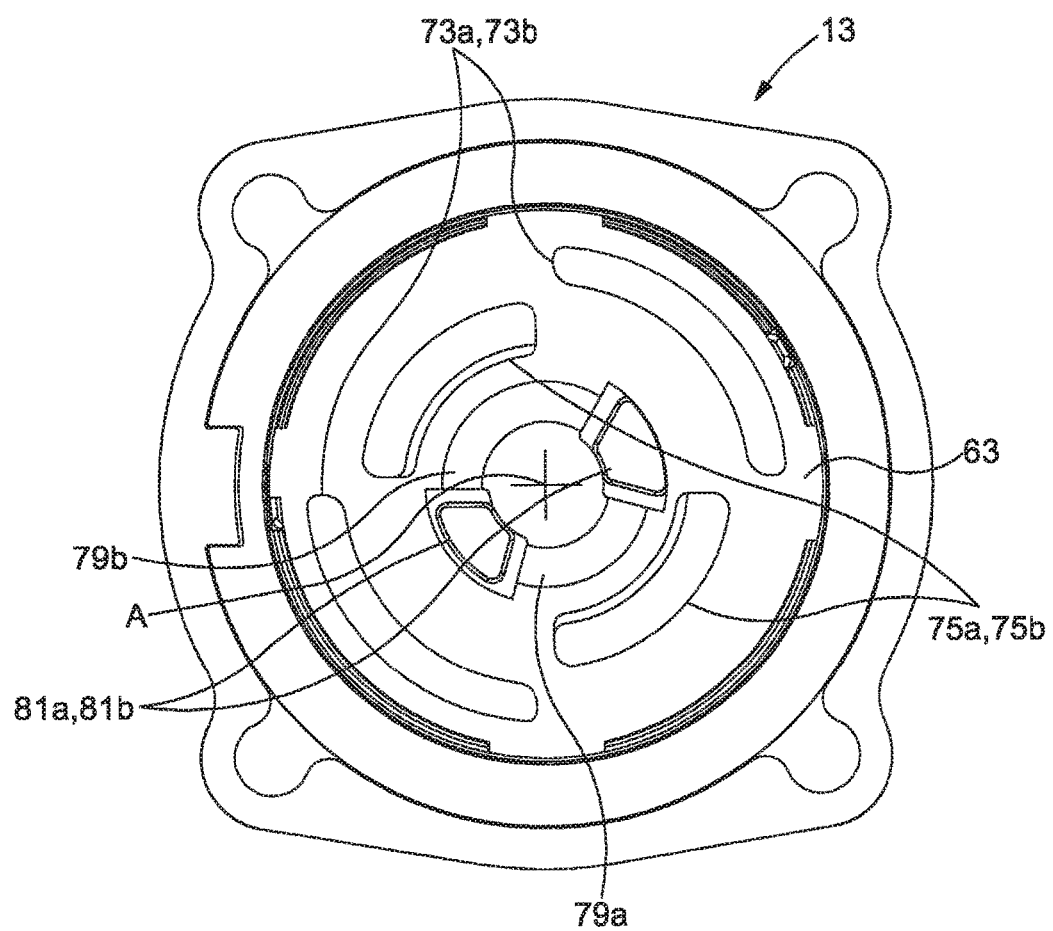
FIG. 6 shows the arrangement of the ceramic discs to shut-off flow.

FIG. 6 shows the flow control device 13 in the "off" position with the rotatable, upper disc 63 arranged to shut-off flow.

In this position, the cold water ports 73a, 73b are offset from the cold water port 65 in the fixed, lower disc 61 and the hot water ports 75a, 75b are offset from the hot water port 67 in the fixed lower disc 61 such that the ports 65 and 67 are closed by the disc 63 and flow of incoming supplies of cold and hot water connected to the cold and hot inlets 15, 17 is prevented from flowing to the cold and hot water inlet ports 25, 27 of the cartridge 21.

Also, in this position, the ports 81a, 81b of the upper disc 63 are offset from the ports 69a, 69b and 71a, 71b in the fixed, lower disc 61 such that the ports 69a, 69b, 71a, 71b are closed by the flange portions 79a, 79b of the disc 63 and flow of temperature controlled water to the first and second outlets 19, 20 is prevented.

Figure 7:
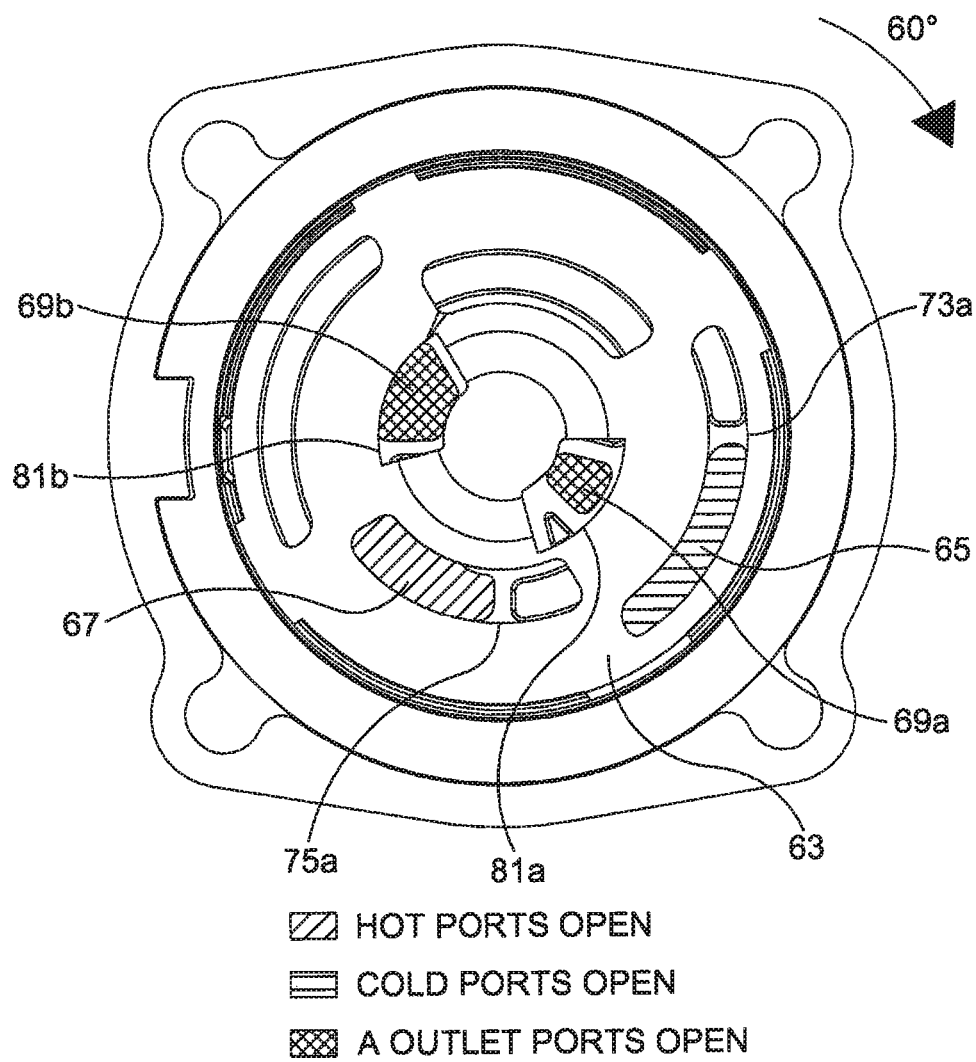
FIG. 7 shows the arrangement of the ceramic discs with the moving disc rotated clockwise from the position shown in FIG. 6 to permit flow to a first outlet.

FIG. 7 shows the flow control device on rotating the rotatable, upper disc 63 in a clockwise direction from the position shown in FIG. 6.

As the disc 63 rotates, the cold water port 73a and hot water port 75a start to overlap the cold water port 65 and hot water port 67 in the fixed lower, disc allowing flow of incoming hot and cold water supplies to the cold and hot water inlet ports 25, 27 of cartridge 21.

At the same, the ports 81a, 81b start to overlap the ports 69a, 69b in the fixed, lower disc allowing flow of temperature controlled water from the outlet port 29 of the cartridge to the first outlet 19 only until the ports 69a, 69b are fully open with the ports 71a, 71b to the second outlet 20 still being closed.

Figure 8:
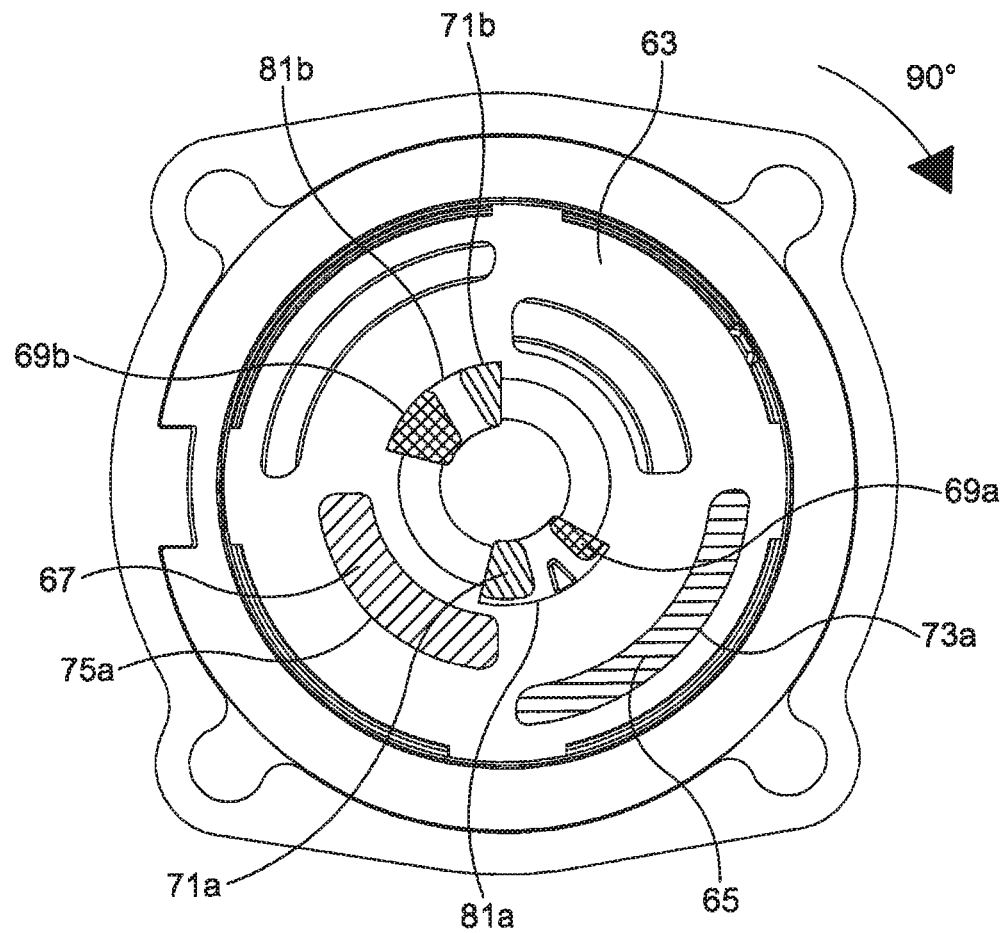
FIG. 8 shows the arrangement of the ceramic discs with the moving disc rotated clockwise beyond the position shown in FIG. 7 to permit flow to the first outlet and a second outlet.

FIG. 8 shows the flow control device on continued rotation of the rotatable, upper disc 63 in the clockwise direction from the position shown in FIG. 7.

As the disc 63 rotates, the ports 81a, 81b start to overlap the ports 71a, 71b in addition to overlapping the ports 69a, 69b allowing flow of temperature controlled water from the outlet port 29 to both the first and second outlets 19, 20.

Figure 9:
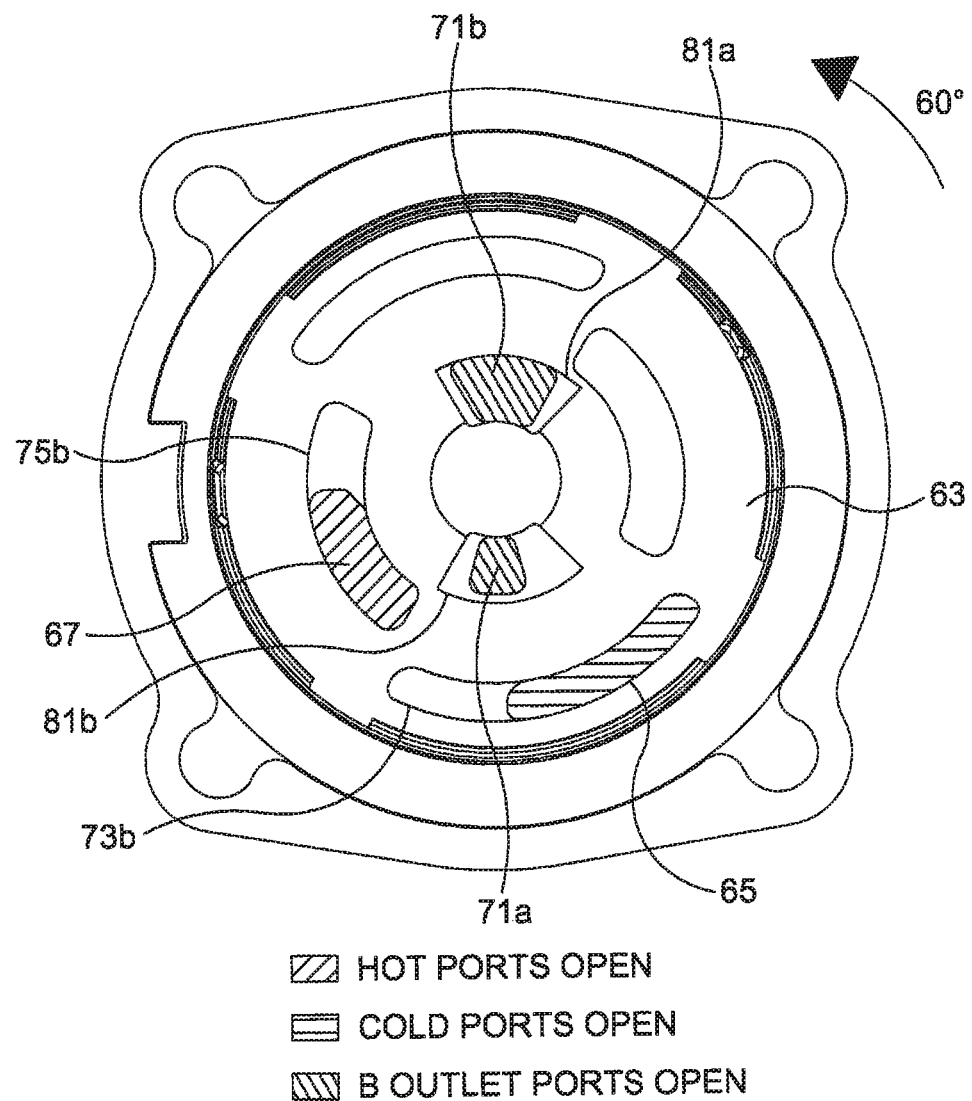
FIG. 9 shows the arrangement of the ceramic discs with the moving disc rotated anticlockwise from the position shown in FIG. 6 to permit flow to the second outlet.

FIG. 9 shows the flow control device on rotating the rotatable, upper disc 63 in a counterclockwise direction from the position shown in FIG. 6.

As the disc 63 rotates, the cold water port 73b and hot water port 75b start to overlap the cold water port 65 and hot water port 67 in the fixed lower, disc allowing flow of incoming hot and cold water supplies to the cold and hot water inlet ports 25, 27 of cartridge 21.

At the same, the ports 81a, 81b start to overlap the ports 71a, 71b in the fixed, lower disc allowing flow of temperature controlled water from the outlet port 29 of the cartridge to the second outlet 20 only until the ports 71a, 71b are fully open with the ports 69a, 69b to the first outlet 19 still being closed.

Figure 10:
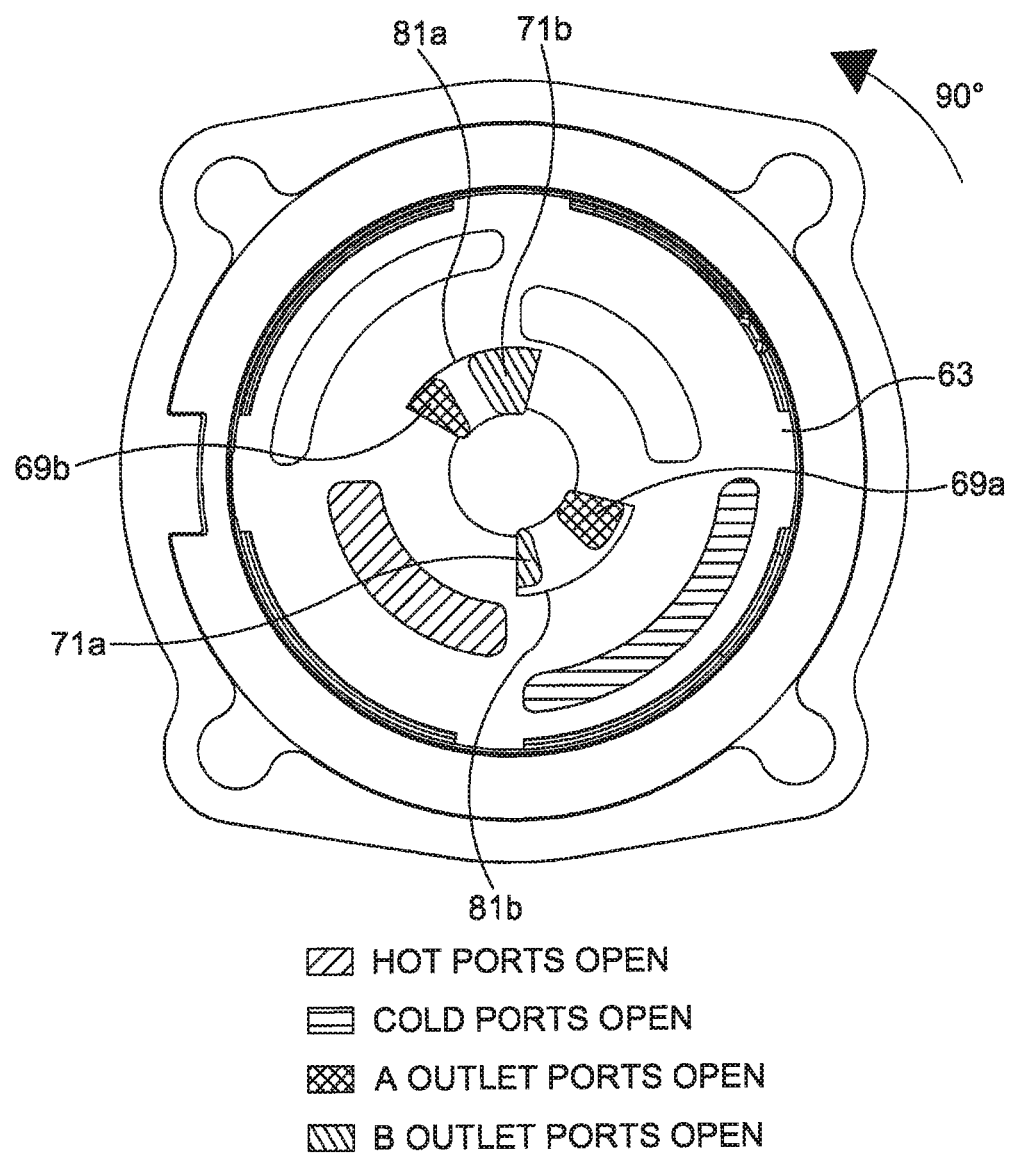
FIG. 10 shows the arrangement of the ceramic discs with the moving disc rotated anticlockwise beyond the position shown in FIG. 9 to permit flow to the second outlet and the first outlet.

FIG. 10 shows the flow control device on continued rotation of the rotatable, upper disc 63 in the counterclockwise direction from the position shown in FIG. 9.

As the disc 63 rotates, the ports 81a, 81b start to overlap the ports 69a, 69b in addition to overlapping the ports 71a, 71b allowing flow of temperature controlled water from the outlet port 29 to both the first and second outlets 19, 20.

As will be appreciated, the configuration of the discs 61, 63 provides both on/off flow control and selection of one outlet 19 or both outlets 19, 20 by rotating the rotatable disc 63 clockwise or selection of the other outlet 20 or both outlets 19, 20 by rotating the rotatable disc 63 counterclockwise.

In this embodiment rotation through 60 degrees in either direction from the "off" position selects a single outlet 19 or 20 and rotation through 90 degrees in either direction from the "off position selects both outlets 19 and 20. It will be understood that this is not limiting and the extent of the rotational movement to select one or both outlets 19, 20 may be altered by appropriate configuration of the ports in the discs.

Figure 11:
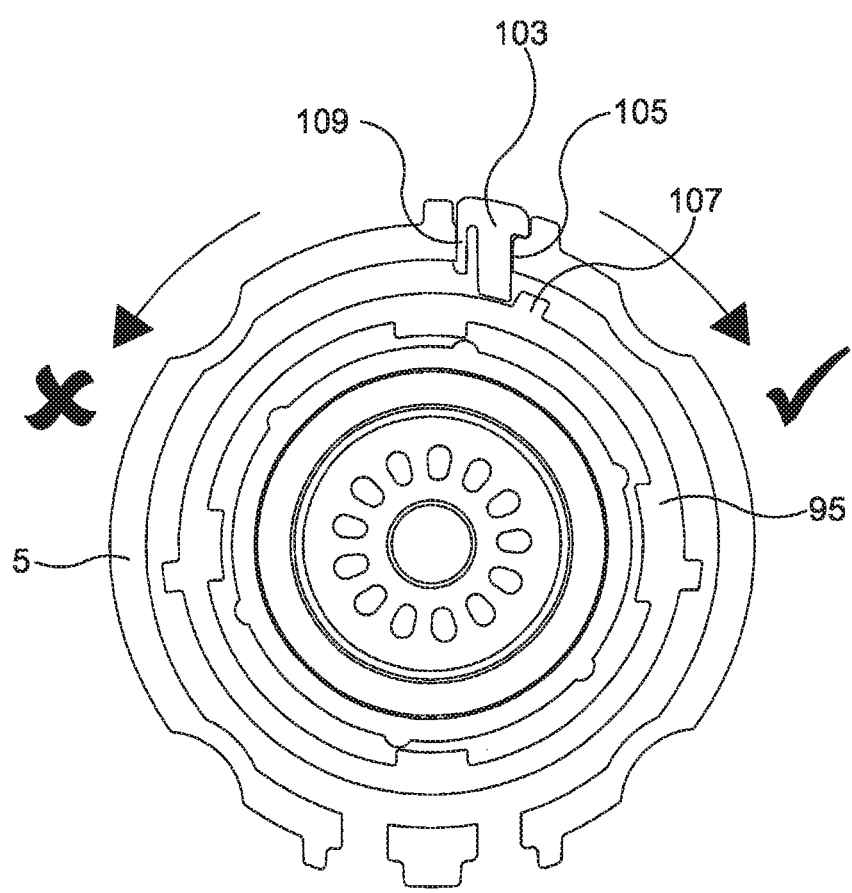
FIG. 11 shows a modification in which a removable stop is provided to allow clockwise rotation of the moving disc from the flow off position to select one outlet and a combination of both outlets and to block anticlockwise rotation of the moving disc from the flow off position to select the other outlet and a combination of both outlets.

Referring now to FIG. 11, there is shown a modification to the exemplary embodiment of FIGS. 1 to 10 in which like reference numerals are used to indicate the same or similar parts.

In the modification shown in FIG. 11, a stop 103 is provided to allow clockwise rotation of the upper disc from the flow off position to select the first outlet 19 and a combination of both outlets 19, 20 as described previously and to block anticlockwise rotation of the upper disc from the flow off position to select the other outlet 20 and a combination of both outlets 19, 20.

The stop 103 is located in an opening 105 in the upper part 5 of the body 3 of the valve 1 and the outer sleeve 95 that drives the upper disc has a rib 107 or other suitable formation co-operable with the stop 103 to control rotation of the outer sleeve 95.

In the flow off position, the rib 107 engages the stop 103 so that anticlockwise rotation of the sleeve 95 from the flow off position to select the second outlet 20 and both outlets 19, 20 is prevented and clockwise rotation of the sleeve 95 from the flow off position to select the first outlet 19 and both outlets 19, 20 is permitted.

In another arrangement, the stop 103 and rib 107 could be arranged such that the rib 107 engages the stop 103 in the flow off position so that clockwise rotation of the sleeve 95 from the flow off position to select the first outlet 19 and both outlets 19, 20 is prevented and anticlockwise rotation of the sleeve 95 from the flow off position to select the second outlet 19 and both outlets 19, 20 is permitted.

The stop 103 is preferably adapted to allow the valve to be configured for use with or without the stop 103. In some embodiments, the stop 103 may be removable and, optionally, a blanking plug (not shown) may be provided to close the opening 105 when the stop 103 has been removed.

Where provided, the stop 103 may be a push fit, preferably a snap fit, in the opening 105 and may be releasably secured in the opening 105, for example by engagement of a resilient detent 109 such as a spring leg or similar formation with the upper part 5 of the body 3.

Alternatively, the stop 103 may be movable between a retracted or release position that allows rotation of the sleeve 95 in both the clockwise and anticlockwise directions and an advanced or blocking position that allows rotation of the sleeve 95 in one direction and prevents rotation in the opposite direction. For example, the stop 103 may be a screw fit in the opening 105.

In other respects, the construction and operation of the valve 1 is similar to the exemplary embodiment of FIGS. 1 to 10.

Figure 12:
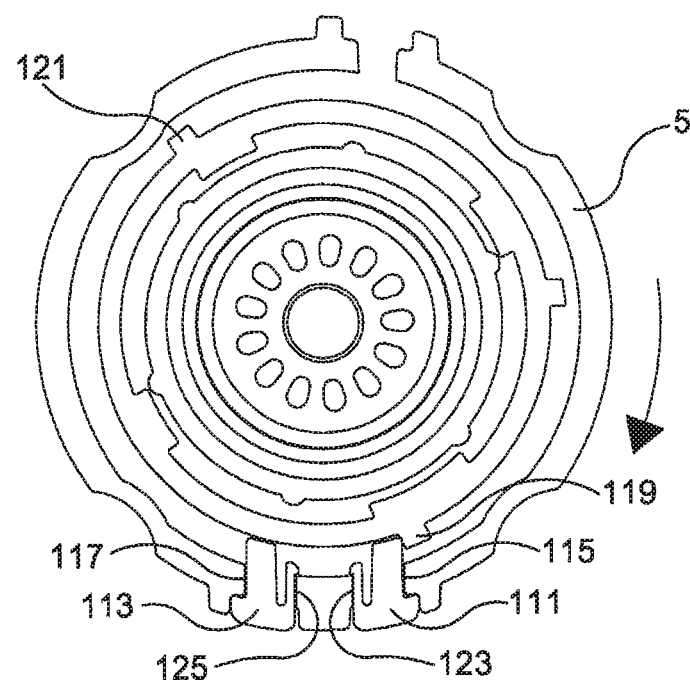
FIGS. 12, 13 and 14 show another modification in which a removable stop is provided to allow clockwise rotation of the moving disc from the flow off position to select one outlet and block selection of both outlets and another removable stop is provided to allow anticlockwise rotation of the moving disc from the flow off position to select the other outlet and block selection of both outlets.
Figure 13:
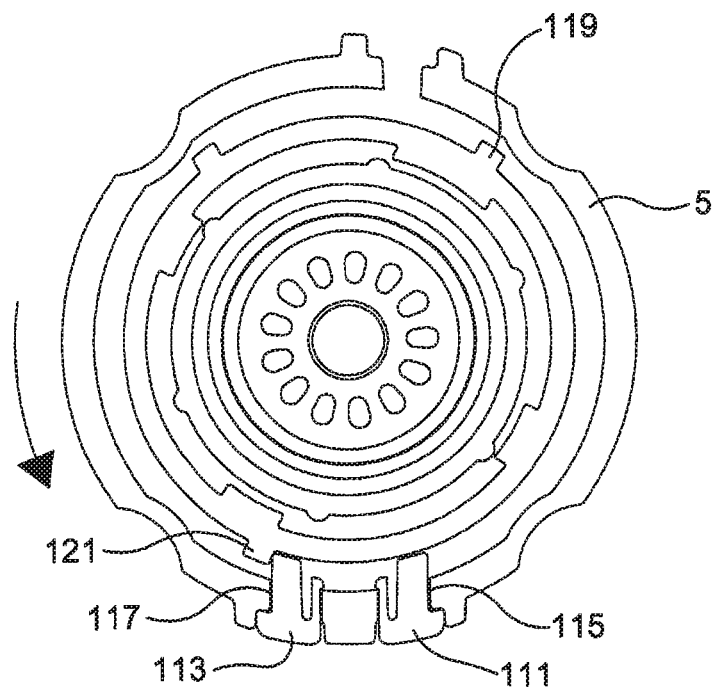

Referring now to FIGS. 12 and 13 there is shown another modification to the exemplary embodiment of FIGS. 1 to 10 in which like reference numerals are used to indicate similar parts.

Figure 14:
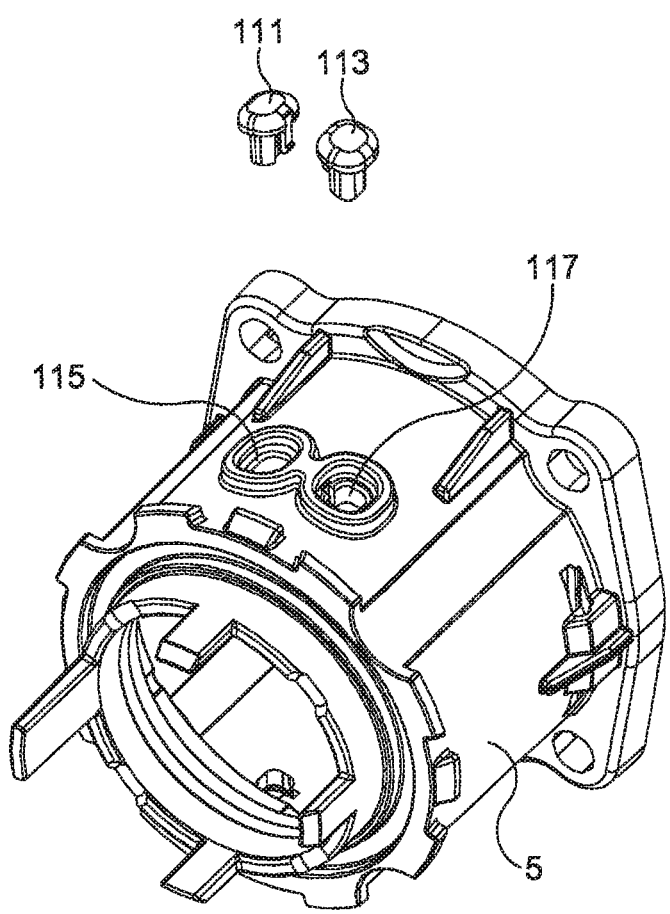

In the modification shown in FIGS. 12, 13 and 14, two stops 111, 113 are provided. One stop 111 allows clockwise rotation of the upper disc from the flow off position to select the first outlet 19 and block further clockwise rotation to select the first and second outlets 19, 20. The other stop 113 allows anticlockwise rotation of the upper disc from the flow off position to select the second outlet 20 and block further anticlockwise rotation to select the first and second outlets 19, 20.

Each stop 111, 113 is located in an opening 115, 117 respectively in the upper part 5 of the body 3 of the valve 1 and the outer sleeve 95 that drives the upper disc has a rib 119 or other suitable formation co-operable with the stop 111 to control rotation of the outer sleeve 95 and another rib 121 or other suitable formation co-operable with the stop 113 to control rotation of the outer sleeve 95.

In the flow off position, the rib 119 is circumferentially spaced from the stop 111 so that clockwise rotation of the sleeve 95 from the flow off position to select the first outlet 19 is permitted and the rib 119 engages the stop 111 to prevent further clockwise rotation of the sleeve 95 to select both outlets 19, 20 (FIG. 12).

Also in the flow off position, the rib 121 is spaced from the stop 113 so that anticlockwise rotation of the sleeve 95 from the flow off position to select the second outlet 20 is permitted and the rib 121 engages the stop 113 to prevent further anticlockwise rotation of the sleeve 95 to select both outlets 19, 20 (FIG. 13).

In other arrangements, one of the stops 111 or 113 may be omitted so that rotation in one direction from the flow off position can be used to select one outlet and then both outlets as described previously and rotation in the other direction can be used to select the other outlet only.

In yet other arrangements, one of the stops 111 or 113 may be employed to allow rotation in one direction from the flow off position to select one outlet and the other stop replaced by a stop 103 similar to FIG. 11 employed to prevent rotation in the opposite direction from the flow off position.

The stop 111, 113 are preferably adapted to allow the valve to be configured for use with or without one or both stops 111, 113. In some embodiments, one or both stops 111, 113 may be removable and, optionally, a blanking plug (not shown) may be provided to close the openings 115, 117 when the stop 111, 113 have been removed.

Where provided, the stops 111, 113 may be a push fit, preferably a snap fit, in the openings 115, 117 and may be releasably secured in the openings 115, 117 for example by engagement of a resilient detent 123, 125 such as a spring leg or similar formation with the upper part 5 of the body 3.

Alternatively, one or both stops 111, 113 may be movable between retracted or release positions that allow rotation of the sleeve 95 in both the clockwise and anticlockwise directions to select either the first outlet 19 or the second outlet 20 or both outlets 19, 20 as described previously and advanced or blocking positions that prevent continued rotation of the sleeve 95 to select both outlets 19, 20. For example, the stops 111, 113 may be a screw fit in the openings 115, 117.

In other respects, the construction and operation of the valve 1 is similar to the exemplary embodiment of FIGS. 1 to 10.

While exemplary embodiments have been described, it will be understood that the concepts disclosed herein are not limited to the exemplary embodiments and that various modifications may be made without departing from the principles or concepts described herein.

In some embodiments, the shuttle may have an overmolded portion providing sealing faces on both sides of the shuttle and a separator seal as described. This is not essential and other arrangements of sealing faces and/or separator seal may be employed. For example, a separate separator seal, for example an O-ring may be mounted on the shuttle or on the sidewall of the body of the cartridge. The overmolded portions forming one or both sealing faces may be omitted and the sealing faces may be provided by the material of the shuttle. One or both of the hot and cold seats may be provided with overmolded portions providing sealing faces for engagement with the sealing faces of the shuttle.

In some embodiments, two relatively rotatable discs may be employed to provide on/off flow control at the inlets and selection of one or more outlets as described. This is not essential and other arrangements may be employed. For example, two relatively rotatable discs for on/off flow control at the inlets may be employed with a single outlet or with two or more outlets. Two relatively rotatable discs to select one or more outlets may be employed with or without on/off flow control at the inlets.

The thermostatic cartridge may be replaced by any other thermostatic cartridge or non-thermostatic cartridge for mixing hot and cold water.

The concepts discussed herein have particular application to mixer valves for shower installations having multiple spray devices connected to different outlets, for example an overhead shower, a handset and body jets. This is not essential and the concepts have application to any installation where it may be desirable to select individual outlets or a combination of outlets. For example, arrangements where an outlet may be used for showering and another outlet may be used for filling a bath, tub, basin, sink or other receptacle for washing or any other purpose.

The construction and arrangement of the elements of the thermostatic valve, and components thereof, as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

For purposes of this disclosure, references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications. Further, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A fluid control valve for mixing hot and cold water comprises an inlet for cold water, an inlet for hot water, and at least one outlet for temperature controlled water, wherein the valve further comprises:
    a temperature control device for mixing hot and cold water to provide a source of temperature controlled water comprising a cartridge having an outer surface and inlet ports, which pass through the outer surface of the cartridge so as to allow water to enter the cartridge, the inlet ports being in communication with the inlets for hot and cold water, and an outlet port in communication with the at least one outlet for temperature controlled water;
    an inner sleeve having a portion of the outer surface of the cartridge received therewithin and that defines with the outer surface of the cartridge a first passageway located outside of the cartridge and between the inner sleeve and the outer surface of the cartridge; and
    an outer sleeve having the inner sleeve and the cartridge received therewithin and that defines with the inner sleeve and the outer surface of the cartridge a second passageway located outside of the cartridge and between the outer sleeve and the cartridge, the first and second passageways configured to deliver hot and cold water from outside of the cartridge to the inlet ports of the cartridge.

2. The fluid control valve of claim 1 wherein the first passageway delivers hot water to the inlet port for hot water and the second passageway delivers cold water to the inlet port for cold water.

3. The fluid control valve of claim 1 wherein the inlet ports of the cartridge are spaced apart in an axial direction.

4. The fluid control valve of claim 1 wherein the inner and outer sleeves are separate.

5. The fluid control valve of claim 1 wherein the valve further has a flow control device for controlling flow of water through the valve.

6. The fluid control valve of claim 5 wherein the flow control device controls flow of water at the inlets and outlets of the valve.

7. The fluid control valve of claim 5 wherein the flow control device comprises control members that are relatively movable to align and misalign ports in the control members to control flow of water at the inlets and outlets of the valve.

8. The fluid control valve of claim 7 wherein the control members are disposed one on top of the other.

9. The fluid control valve of claim 7 wherein there are two control members.

10. The fluid control valve of claim 9 wherein one control member is fixed and the other control member is movable relative to the fixed control member.

11. The fluid control valve of claim 10 wherein the movable control member is rotatable relative to the fixed control member.

12. The fluid control valve of claim 11 wherein the control members comprise discs.

13. The fluid control valve of claim 11 wherein the rotatable control member is coupled to the outer sleeve and is rotatable with the outer sleeve for controlling flow of hot and cold water to the cartridge.

14. The fluid control valve of claim 11 wherein the control members have inlet ports that can align or at least partially align in response to relative movement to control flow of water at the hot and cold inlets and that can misalign to shut-off flow of water at the hot and cold inlets.

15. The fluid control valve of claim 11 wherein the outlet port of the temperature control device is coaxial with an axis of rotation of the rotatable control member.

16. The fluid control valve of claim 11 wherein the outlet port is offset from the axis of rotation.

17. The fluid control valve of claim 11 wherein the hot and cold water inlet ports of the flow control device are spaced from the axis of rotation of the rotatable control member.

18. The fluid control valve of claim 17 wherein the inlet ports are concentric with the axis of rotation.

19. The fluid control valve of claim 11 wherein the hot and cold water inlet ports of the flow control device are spaced apart in a radial direction and a circumferential direction.

20. The fluid control valve of claim 19 wherein the hot water inlet ports communicate with the first passageway and the cold water inlet ports communicate with the second passageway or vice versa.

21. The fluid control valve of claim 11 wherein the valve has at least two outlets for temperature controlled water and the control members have outlet ports that can align or at least partially align in response to relative movement to control flow of water at the outlets and that can misalign to shut-off flow of water at the outlets.

22. The fluid control valve of claim 21 wherein relative movement of the members aligns or at least partially aligns outlet ports of one or both outlets.

23. The fluid control valve of claim 22 wherein the movable member is rotatable in a clockwise direction to permit flow to a first outlet and then to the first outlet and a second outlet.

24. The fluid control valve of claim 23 wherein the movable member is rotatable in an anti-clockwise direction to permit flow to the second outlet and then to the second outlet and the first outlet.

25. The fluid control valve of claim 21 wherein the outlet ports of the flow control device are inboard of the hot and cold water inlet ports.

26. The fluid control valve of claim 25 wherein the outlet ports are spaced from the axis of rotation of the rotatable control member.

27. The fluid control valve of claim 26 wherein the outlet ports are concentric with the axis of rotation.

28. The fluid control valve of claim 21 wherein one or more stops is provided to block rotation of the movable member to prevent flow to an outlet or combination of outlets.

29. The fluid control valve of claim 28 wherein a stop allows rotation of the movable member in the clockwise direction to select the first outlet and the first and second outlets and to block rotation in the anticlockwise direction to select the second outlet and the first and second outlets and vice versa.

30. The fluid control valve of claim 28 wherein a pair of stops allow rotation of the movable member in the clockwise direction to select the first outlet and in the anticlockwise directions to select the select outlet and to block rotation in both directions to select both the first and second outlets.

31. The fluid control valve of any of claim 28 wherein the or each stop is movable to a position in which the stop is inoperable.

32. The fluid control valve of claim 31 wherein the or each stop is detachable.

* * * * *